Figure 1:
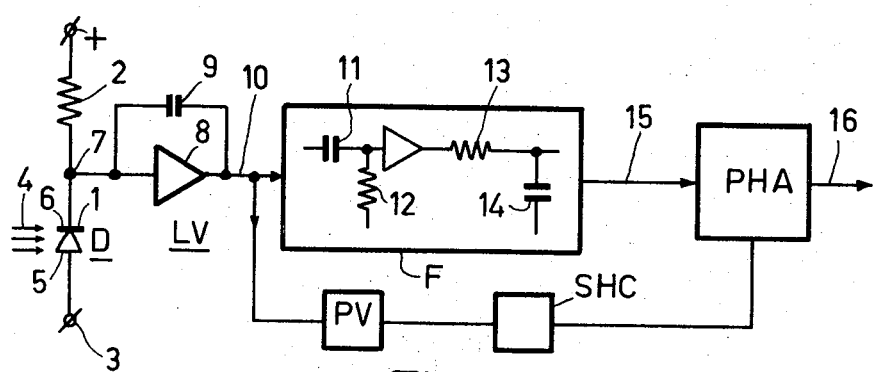

United States Patent

Koeman

[11] 3,872,287
[45] Mar. 18, 1975

[54] METHOD OF, AND APPARATUS FOR, DETERMINING RADIATION ENERGY DISTRIBUTIONS

[75] Inventor: Henriecus Koeman, Amsterdam, Netherlands

[73] Assignee: U. S. Philips Corporation, New York, N.Y.

[22] Filed: July 26, 1972

[21] Appl. No.: 275,320

[30] Foreign Application Priority Data
July 30, 1971 Netherlands........................ 7110516

[52] U.S. Cl............. 235/151.31, 235/183, 250/336, 250/370
[51] Int. Cl............................. G01t 1/15, G06g 7/18
[58] Field of Search............ 235/183, 151.3, 151.31, 235/151.35; 328/151, 115, 116; 250/336, 370

[56] References Cited
UNITED STATES PATENTS
3,448,255   6/1969   Murphy .............................. 235/183
3,486,025   12/1969  Brinkerhoff et al. ............. 235/151.3
3,555,260   1/1971   Karohl ............................... 235/183
3,654,468   4/1972   Shah ............................. 250/83.3 R
3,671,746   6/1972   Thiele et al. .................. 250/83.3 R Primary Examiner—Felix D. Gruber
Attorney, Agent, or Firm—Frank R. Trifari

[57] ABSTRACT

Method and apparatus for measuring the energy distribution of ionizing radiation distinguished by a good signal-to-noise ratio, a fast response and a high degree of accuracy. By using switched integrators after a charge-sensitive amplifier connected to the radiation detector, by storing the results of integrations performed in a time T both preceding and following the instant at which a radiation quantum strikes the detector and by adding and subtracting them, a good signal-to-noise ratio is obtained, while the speeds of measuring and data processing are increased, because radiation quanta which are close to each other in time are either still measurable or are eliminated.

7 Claims, 7 Drawing Figures

METHOD OF, AND APPARATUS FOR, DETERMINING RADIATION ENERGY DISTRIBUTIONS

The invention relates to a method of determining the energy distribution of ionizing radiation in which the radiation is applied to a radiation detector which converts radiation quanta into current pulses which are converted by a charge-sensitive integrating amplifier into a stepped signal the step height of which is a measure of the energy of the radiation quantum. The output from the charge-sensitive amplifier is integrated both before and after an instant $t_p$ at which a current pulse is produced, the result of the integration performed before the instant $t_p$ being subtracted from the result of the integration performed after this instant, the result being a measure of the step height. The invention also relates to an apparatus for carrying out this method.

It is known to use spectrometers to analyse nuclear radiation. The spectrometers may be used for non-destructive investigation of the composition of materials. For this purpose the material is irradiated, for example by a source of neutrons, causing the elements which constitute the material to be converted into isotopes which in turn revert to the original element with emission of a characteristic radiation. The elements emitting the radiation can be determined from the energy spectrum, which is composed of discrete energy values. The intensity of a characteristic radiation energy determines the concentration of the corresponding element in the material. In energy-dispersive X-ray spectrometry the material is irradiated by an X-ray tube, with the result that an X-ray spectrum characteristic of each element is emitted.

In order to measure the emitted radiation a spectrometer is used which measures both the spectrum, i.e., the energy levels, and the intensity. A usual method is to convert the radiation quanta which each represent an energy level, into a measurable quantity and to count the number of times this quantity is produced in a given period of time.

"Semiconductor Detectors," G. Bertolini and A. Coche, North Holland Publishing Company, Amsterdam, 1968, pages 1 to 7, enumerates radiation counters which may be used, while FIG. 3.1.1 on page 202 shows a diagram of a spectrometer. W. L. Brown et al. in "Semi-conductor Nuclear-Particle Detectors and Circuits," Publication 1953, National Academy of Sciences, Washington D.C., 1969, pages 495 to 505, shows the state of the art in the field of spectrometers, and on pages 544 to 552, FIGS. 1 and 3, deals with a few measuring systems. The latter systems are distinguished by a satisfactory signal-to-noise ratio and a high permissible mean counting rate. Since in modern methods of analysis the tendency is to use short irradiation periods, in order to achieve the same statistical exactness, measurements must be performed with increased intensities.

Since this causes an increase in the probability that several radiation quanta will be separated by a time interval smaller than the measuring duration for a single radiation quantum, so that the measurement is disturbed, attempts are made to reduce the measuring duration of each radiation quantum to a minimum while, however, retaining a satisfactory signal-to-noise ratio.

The occurrence of quanta separated by too short a time interval must be accurately detected, so that they are not accepted for registration and hence do not interfere with the statistical image.

The number of times that this happens can be counted for use in determining intensity.

It is an object of the invention to provide an improved method of achieving the described purposes.

To this end a method of determining the energy distribution according to the method described at the beginning of this specification is characterized in that during time intervals of duration $t_n$ the output signal from the charge-sensitive amplifier is integrated, the integration results being stored in time sequence and the step height being determined by subtracting the summed integration results obtained in a period of time $t_p - T$ from the summed integration results obtained in a time period $t_p + T$, where $T$ is equal to $n \cdot t_n$.

The invention is based on the recognition that the signal-to-noise ratio is close to the theoretically attainable optimum if fixed integration periods preceding and succeeding a signal step are used, whilst calculations have shown that the signal-to-noise ratio obtained in the overall measuring time $2T$ is comparable to, or better than, the signal-to-noise ratio obtained by the known methods of measuring in which a pulse measuring time of $2T$ is also used.

However, the method according to the invention enables a radiation quantum to be measured in each time $T$, so that the pulse measuring times may overlap almost 50 percent.

The use of a sufficient number of short integrating periods $n$ enables a signal step to be detected with a sufficient degree of accuracy, thus solving the problem of determining at which instant integration is to be commenced while waiting for the next signal step.

In a more elaborate embodiment of the said method according to the invention, in the summing process each integration result is assigned a weight which is higher as the subinterval is closer to the instant $t_p$. This has the advantage that an additional filter action is obtained without build-up and decay times, as inherent in conventional filters, influencing the measurement. Thus the signal-to-noise ratio is improved.

Another method according to the invention is characterized in that the integration result obtained in the sub-interval in which the instant $t_p$ lies and the integration results obtained in at least one of the immediately succeeding adjoining sub-intervals is neglected in the summing process. This has the advantage that rise times of the stepped signal within the boundaries of a single integration sub-interval are left out of account and that inaccuracies in the detection circuit which is used to determine the occurrence of a signal step, i.e., to accurately determine the instant $t_p$, do not have any influence either.

When the measuring device is too slow to perform a measurement each $t_n$ seconds, the duration of an integration period may be added to the measuring time for the measuring device by arranging the measuring device to have a preset value which is equal to the result of the measurement of the preceding integration period, for as long as no signal step occurs the changes in the measurements are due to noise only. If now a signal occurs, the measurements change abruptly and the ignored measurement of the integration period after the occurrence of the signal step may be used as the present value for the measurement of the next integration period.

Owing to imperfections in the crystal structure of semiconductor radiation detectors charges may be liberated which are temporarily captured. Such a charge is gradually liberated again and gives rise to an undesirable slow increase in the integration results. Because these liberated changes interfere with the measurement, they must be detected.

Another embodiment of the method according to the invention permits this detection. This method is characterized in that the stored integration results obtained during the time $T$ are compared to each other, enabling a slow rise due to slow charge phenomena in the radiation detector to be detected.

Another disturbing factor in the step height measurements is a leakage current in the radiation detector which increases as a function of the incident radiation intensity. This means that the signal step due to a single incident radiation quantum is superposed on a continuously increasing signal. As a result, an excessive measuring result is obtained for each radiation quantum, the excess being a linear function of the slope of the increasing signal. By performing a zero-energy measurement periodically, that is not at an instant $t_p$, this excess may be determined and may be allowed for in processing the measuring results by subtracting the excess from each step height determined. This requires that the slope should be assumed to be constant. The repetition frequency of this zero-energy measurement may be chosen as a function of any change in slope.

Another method according to the invention is based on the recognition that a correct and accurate measurement can only be effected if the stored integration data are maintained unchanged for a time $T$. In particular when the radiation time is short and the radiation intensity is high the likelihood of a rapid succession of radiation quanta is great, and the measurements which succeed each other within a time $T$ must be left out of account to permit a sufficiently exact statistical observation. For this purpose a method according to the invention is characterized in that the summation of the stored results is cancelled if successive instants $t_{p1}$, $t_{p2}$ are spaced by an interval smaller than the time $T$.

Hence, in adjusting the apparatus used to carry out the methods according to the invention allowance must be made for the noise spectrum and for the rapid succession of signals. The methods according to the invention are particularly suitable for obtaining a self-adjusting system, the overall integration time $T$ being automatically adjusted as a function of the succession in time of the measuring signals. This may be effected in an analogue manner by integrating the time intervals between the measuring signals and determining $T$ from the integration results, however, alternatively it may digitally be effected by determining the smaller or two time intervals, namely the time interval between a preceding signal and a signal to be processed and the time interval between a succeeding signal and the signal to be processed, and by making the integration time $T$ smaller than the smaller time interval. This requires that both the measuring results and the instants $t_p$ should be stored in their order of succession in time and that the measuring signal to be determined should be processed at a later instant.

For this purpose a method according to the invention is characterized in that the consecutive instants $t_{p1}$, $t_{p2}$ and $t_{p3}$ in order of time should be first stored and that from the time intervals $t_{p2} - t_{p1}$ and $t_{p3} - t_{p2}$ there is determined the period of time $T$ which is smaller than the smaller of the two said time intervals, after which the step height is determined which is associated with the instant $t_{p2}$, allowing for a standardization relating to the time period $T$.

The apparatus by means of which the methods according to the invention are carried out may be of the analogue type: the measuring device, the stores, the summing devices and the subtracting devices may be built from amplifiers and capacitors, control being effected by means of semiconductor switches and programming devices. Preferably digital equipment will be used because it is capable of operating more exactly, more stably and more rapidly and may simply be controlled via a computer, so that the various operations may be effected with the aid of computer programming.

An apparatus for carrying out the first mentioned method comprises a radiation detector, a charge-sensitive amplifier, integrators, a measuring device, a signal recognition circuit and a data processing device, and according to the invention this apparatus is characterized in that it comprises a first switching device which connects the output of the charge-sensitive amplifier successively to each integrator for a time $t_n$, and a second switching device which connects the output of each integrator to the measuring device the output of which is connected to a multiple store for storing the measuring information and also to a signal recognition circuit which determines the instant $t_p$, and in that the data processing device comprises an arithmetical store which is connected to the multiple store, counting circuits connected to the output of the signal recognition circuit and to the arithmetical store, and a final-result store which is connected to the counting circuits and to the arithmetical store and serves to store the results of the arithmetical operations as a measure of the energy of each radiation quantum applied to the radiation detector.

By using, for example, only two integrators, two change-over switches which alternately but in phase opposition establish the connections, and a single measuring devive, the measuring period is always optimally utilized, because the processes of integrating, measuring and storing information are performed parallel in time.

Figure 2:
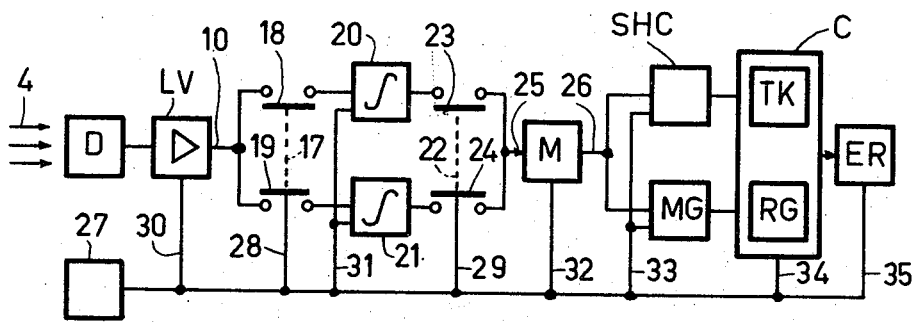
Figure 3:
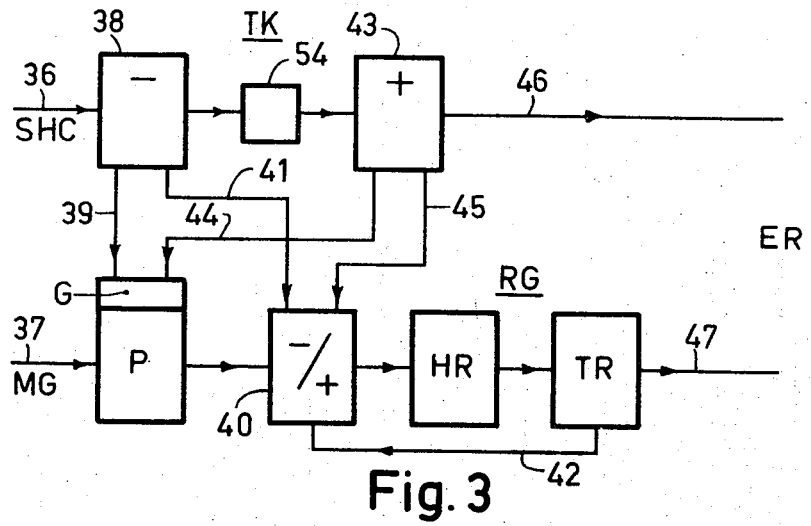
Figure 4:
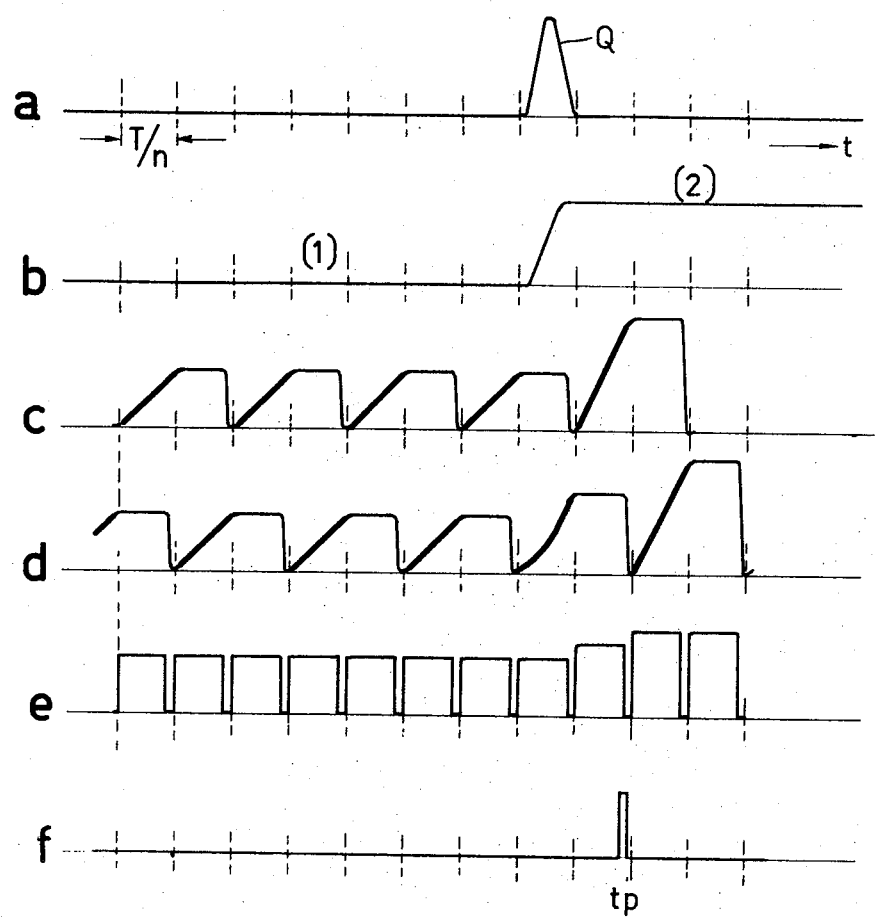
Figure 5:
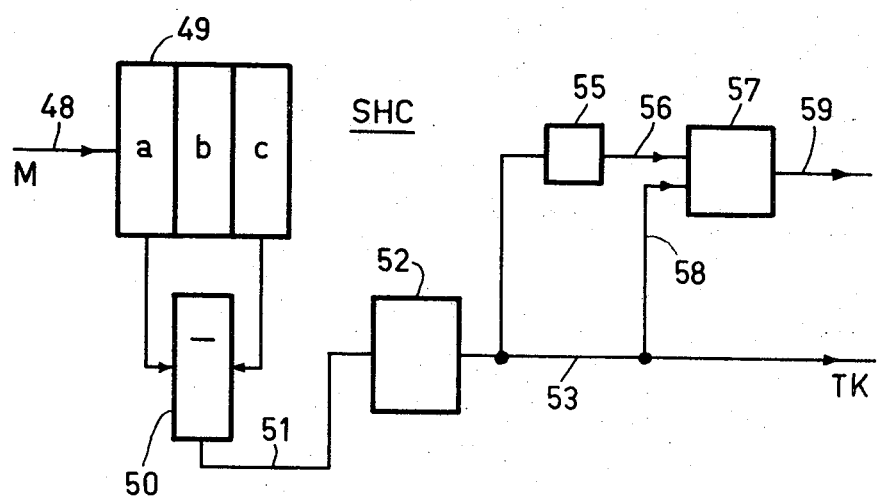
Figure 6:
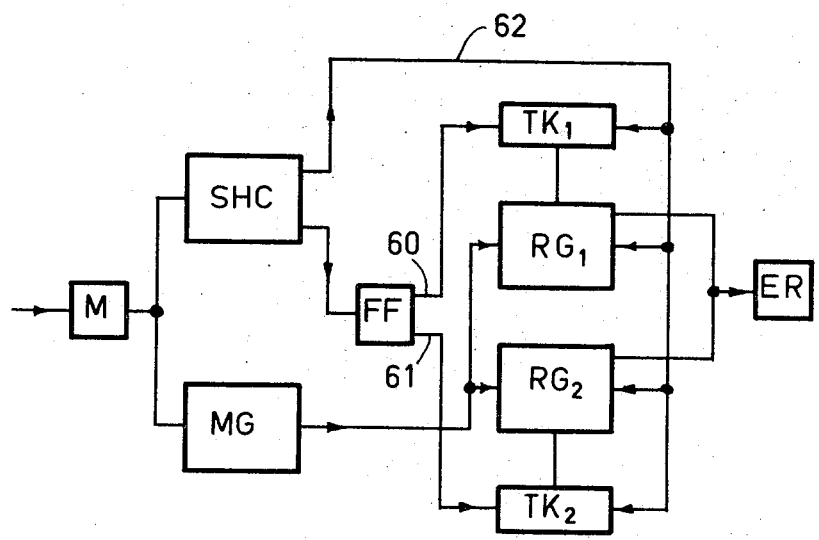
Figure 7:
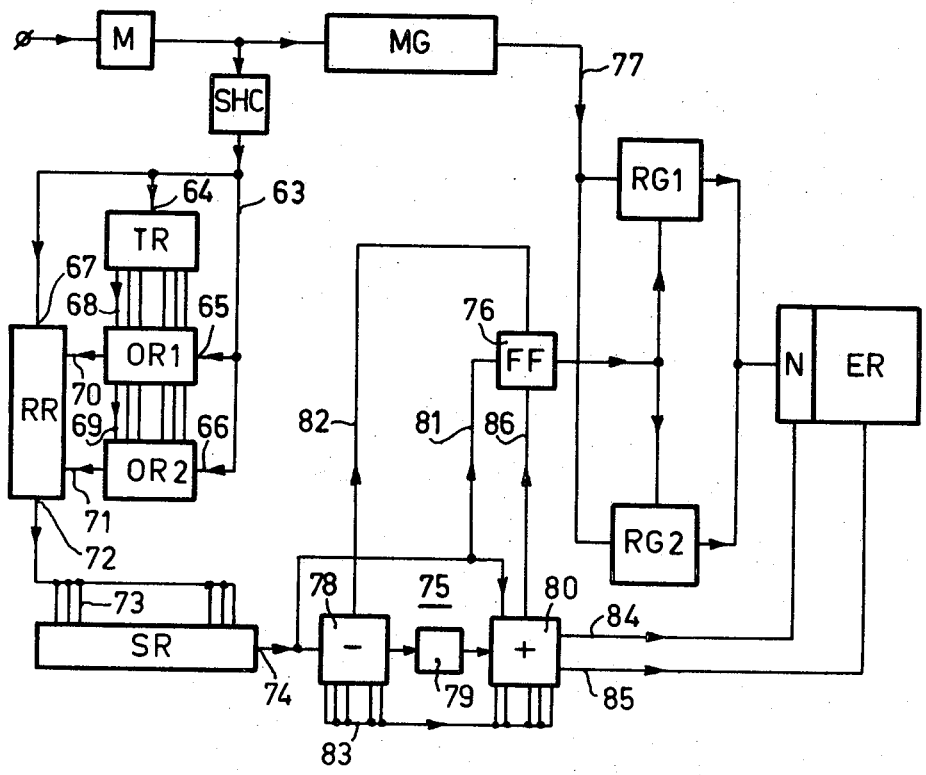

Embodiments of apparatus according to the invention in which the methods of the invention are used will now be described by way of examples and in the greater detail to illustrate the advantages of the invention with reference to the accompanying diagrammatic drawings, in which:

FIG. 1 is a block diagram of a known spectrometric apparatus,

FIG. 2 is a block diagram of an apparatus for radiation measurement according to the invention, FIG. 3 is a block diagram of the data processing apparatus according to the invention, FIG. 4 is a time diagram associated with FIG. 2, FIG. 5 is a block diagram of a signal recognition circuit according to the invention, FIG. 6 is a block diagram of this measuring and data processing part of an apparatus according to the invention, and FIG. 7 is a block diagram of the measuring and data processing part having optimum integration time determination according to the invention.

The known spectrometer shown in FIG. 1 comprises the following basic elements: a radiation detector D, a charge-sensitive amplifier LV, a filter network F and a pulse height analyser PHA which is activated by a signal recognition circuit SHC which receives information from a pulse shaper PV connected to the output of the charge-sensitive amplifier LV.

The radiation detector D comprises a semiconductor element 1 on which is incident the radiation 4 the energy distribution and intensity of which is to be measured.

The semiconductor element 1 is reversely biased by a source 3 of a high voltage via a resistor 2. The radiation quanta of which the radiation 4 is composed liberate pairs of holes and electrons in the semiconductor material in amounts which are proportional to their energies, the holes and electrons being driven to the anode 5 and the cathode 6 respectively by the bias voltage. This means that in the detector circuit a current of a pulsatory nature flows, which may be measured in a point 7 by a charge-sensitive amplifier LV which comprises an amplifier 8 and a capacitor 9 which together form an integrator by which the current pulse in the point 7 is integrated, providing a charge contribution to the capacitor 9. Thus there appears at the output 10 of the amplifier circuit LV a stepped signal the height of which is a measure of the charge liberated in the semiconductor element 1 and hence of the energy of the radiation quantum. Since the detector D and the amplifier LV include several noise sources, a filter F is required to enable the step height to be measured at the optimum signal-to-noise ratio. A known filter comprises a differentiating part including a series capacitor 11 and a parallel resistor 12 and an integrating part including a series resistor 13 and a parallel capacitor 14, the time constants of the two parts generally being arranged to have equal values such as to provide an optimum signal-to-noise ratio. The signal is applied through a lead 15 to a pulse height analyser PHA to measure the pulse height. The analyser PHA is activated by a signal recognition circuit SHC which causes it to perform a measurement only if a stepped measuring signal is produced at the output of the amplifier LV. The measuring results are available on an output lead 16 for further processing and storage.

The block-schematic diagram of FIG. 2 also shows a radiation detector D on which radiation 4 is incident and a charge-sensitive amplifier LV of the types shown in FIG. 1, however, the filter F, the pulse height analyser PHA, the pulse shaper PV and the signal recognition circuit SHC have been replaced.

The output signal from the amplifier LV is applied via a connection 18 of a change-over switch 17 to an integrator 20 during a time period of $t_n$ seconds. The integration performed in the integrator eliminates part of the noise spectrum. During the next period of $t_n$ seconds the connection 18 is broken and a connection 19 is made, so that the signal at the output 10 now is integrated by an integrator 21. The output signals from the integrators are alternately applied through connections 23 and 24 of a change-over switch 22 to the input 25 of a measuring device M for outputting a measuring signal. Said device may be in the form of an accurate direct-voltage amplifier or of an analogue-digital convertor. The switches 17 and 22 are controlled by a control device 27 which so controls them via leads 28 and 29 respectively that the connection 18 and 24 are simultaneously closed and the connections 19 and 23 are simultaneously open, and conversely. The measuring signal at the output 26 of the measuring device M is applied to a multiple store MG and to a signal recognition circuit SHC. The multiple store MG has a storage capacity of $n$ measured values and is connected so that each measured value is stored for $T$ seconds. Thus at any instant the $n$ measuring results of the integrations over $t_n$ seconds of the preceding period of $T$ seconds are available. The signal recognition circuit has a limited storage capacity of at least two measuring results and compares these with each other and delivers a signal when there is a sudden variation in the measured values which is of sufficient height to conclude therefrom that the detector $D$ has received a radiation quantum to be measured. At an instant $t_p$ this signal from the circuit SHC is applied to a data processing device C which as a result starts to take over the information stored in the multiple store MG, in which process the $n$ items of measuring information stored in the store MG during a time $T$ preceding the instant $t_p$ are added together and provided with a minus sign, after which $n$ items of measuring information stored during a time $T$ succeeding the instant $t_p$ are transferred from the memory MG, added and provided with a plus sign. The results of the two additions are then added together, providing a measure of the height of the signal step at the output 10 of the amplifier LV. This result is applied to a final result register ER. An optimum signal-to-noise ratio is obtainable by appropriately setting the time $T$. The integration partially eliminates the high-frequency noise from the result of the integration, whilst owing to the operations of addition and subtraction the influence of low-frequency components or drift is attenuated. An appropriate division into $n$ sub-intervals enables the instant at which a detector pulse appears to be detected with a sufficient degree of accuracy and the phenomenon of pulses which rapidly succeed one another ("pile up") to be indicated more accurately.

The connections 18, 19, 23 and 24 may be established by suitable semiconductor switches. Also, more than two integrators may be used and the measuring device M may have two parallel operating separately controlled measuring circuits. In the diagram of FIG. 2 a lead 30 connecting the control unit to the charge-sensitive amplifier LV shows that the output level at the output 10 may be reset to a starting level at a suitable instant. Similarly a connection 31 to the integrators 20 and 21 indicates that these may be reset to a starting level, whilst connections 32, 33, 34 and 35 indicate that the various operations will be effected at appropriate instants under the control of the control unit 27. A reason for the use of three integrators may, for example, be that they have comparatively long reset times. With three integrators the cycle consists in that each integrator for three successive periods of $t_n$ seconds first integrates, than transfers the measured value and finally is reset respectively. The use of four integrators permits the following cycle, in which likewise a prolonged reset time is available for each integrator whilst the measuring device is present: the integrator integrates for a period of $t_n$ seconds, during the next period the integrated value is used to preset the measuring device, which in the meantime is processing another measured value, during the third period the integrated value is actually measured by means of the presetting, and during the fourth period the integrator is reset.

The time diagram of FIG. 4 shows the switching periods with the use of two integrators as shown in FIG. 2. The horizontal time axis is divided into periods of $T/n$ seconds each. During the first periods the integrators 20 and 21 are alternately connected to the output 10 which has a signal level (1), see FIG. 4b. Each integrator periodically integrates this level, as is shown by heavy lines in FIGS. 4c and 4d. In each intermediate period the output level of the integrator remains constant and the measuring device is actuated to perform a measurement, see FIG. 4e. At the end of this period the output level of the relevant integrator drops back to a starting level and the measuring device has completed its measurement. FIG. 4a shows symbolically that at a given instant a radiation quantum Q strikes the detector D. As FIG. 4b shows, this causes the output level at the output 10 to rise from the level (1) to a level (2). This manifests itself in the integration, FIGS. 4c and 4d, and in the measuring result of the measuring device M, see FIG. 4e. At the instant $t_p$ the signal recognition circuit SHC detects a difference in level and delivers a signal, as is shown in FIG. 4f.

In an embodiment of an apparatus according to the block diagram of FIG. 2 digital techniques may advantageously be used. In this embodiment the measuring device M is an analogue-digital converter which converts the measured value applied to the input 25 into, for example, $m$ bits which it delivers in parallel at the output. Thus the measured values appear at intervals of $T/n$ seconds at the output 26 as words of $m$ bits. The multiple store MG is in the form of a shift register of $n$ words which each time a measured-value word is offered stores it in a first storage layer and simultaneously shifts the information originally stored in this layer to a second layer, the information originally stored in this second layer being shifted to a third layer, and so on. To the final storage layer a new word is supplied each time, the previously stored information being destroyed. This means that each measured value is shifted $n$ times in the form of a word and hence has a life of $n$ $(T/n) = T$ seconds. Similarly the signal recognition circuit may contain a two- or multi-layer word shift register and a digital comparator in the form of a subtraction circuit which each time substracts the two or three words from one another to determines whether the result of the subtraction has a sufficient digital value to deliver a signal at the instant $t_p$ when a reference is exceeded, which means that there is a signal step. This signal activates counting circuits, which in FIG. 2 are denoted by TK, which enable word shift registers in an arithmetic store RG to be connected to the multiple store MG, so that the words in the final storage layer of MG are not lost but are shifted, and also the instants to be counted at which adding and subtracting operations are to be performed.

FIG. 3 is a block diagram of a counting circuit and an arithmetic store. The output signal from the signal recognition circuit is applied (at the instants $t_p$) via a lead 36 to a counter 38 having $n$ positions which as soon as it is started enables, via a lead 39, a gate circuit P which is connected to the multiple store MG via a lead 37. As a result, the gate circuit P is capable of transferring each word from the final storage layer of MG to a subtraction addition control circuit 40, which is set to the "subtraction" condition by the counter 38 via a lead 41. Via an auxiliary register HR the words are shifted to an intermediate-result register TR which is connected by a lead 42 to the control circuit 40, permitting subtraction operations to be performed in that the intermediate result from TR is each time offered to the control circuit 40, the new word from the gate circuit P being subtracted therefrom by means of the auxiliary register HR. The result of this subtraction is transferred to TR and is available on the lead 42. In the meantime the counter 38 counts $n$ subintervals of $t_n$ seconds each. After these $n$ subintervals the connections through the leads 39 and 41 are broken, and the subtraction counter 38 actuates an addition counter 43 which through a lead 44 enables the gate circuit P and via a lead 45 sets the addition subtraction control circuit 40 of the addition condition, causing the words from the multiple store to be added to the last intermediate-result word from TR. The addition counter 43 also counts $n$ periods of $t_n$ seconds each and then breaks the connections through the leads 44 and 45 so that the gate circuit P is blocked, the supply of measuring result words stops and the intermediate result in TR does not change anymore.

This intermediate result is proportional to the measured and digitalized signal step height. Hence at this instant the addition counter 43 via a lead 46 applies a signal to the final-result register ER, see FIG. 2, instructing it to take over the intermediate result from the register TR via a lead 47. When this has been done, all the counters and registers are reset to zero, FIG. 2.

FIG. 5 is a block diagram of a signal recognition circuit which may be used with digital organization of the circuits of FIG. 2.

Through a connection 48 to the output 26 of the measuring device M the measuring words are applied to a triple word shift register 49 which comprises a storage layer $a$, an intermediate layer $b$ and a layer $c$, which layers each are capable of containing a measuring word of $m$ bits. The words contained in $a$ and $c$ are subtracted from one another in a substraction unit 50 in each period $t_n$. If these words are equal, the digital datum "zero" appears on the connection 51 to the comparator 52. If the words are not equal, the comparator 52 will compare the appropriate bits with a reference value and, when the latter is exceeded, will give a signal on the connection 53 to initiate the arithmetic operations. This is effected at the instant $t_p$.

To utilize the devices described with reference to FIGS. 2, 3 and 5 in an optimum manner a few simple additions may be made.

For example, the filter action of the system shown in FIG. 2 may be increased by weighting each measuring result which is applied to the gate circuit P of FIG. 3 via the lead 37. For this purpose, in the arrangement shown in FIG. 3 there is added to the gate circuit P a weighting register G which as a function of the counting positions of the subtraction counter 38 and the addition counter 43 multiplies an incoming word by a weighting number, this number being greater for the words, i.e., the measurements, produced and stored in the sub-intervals close to, i.e., both before and after, the instant $t_p$. As an example we will take $n = 16$; the first eight words remain unchanged by choosing the weight to be 1. When the subtraction counter reaches the ninth counting position, a weight 2 is used in the weighting register, which means that the ninth word is multiplied by 2 in that all the bits in the word are shifted one place to the left. Similarly the bits of the 10th, 11th and 12th words are shifted one place. When the 13th counting position is reached the register G uses a weight of 4 for the next four words, which means that the bits of these words are shifted two places. As soon as the addition counter is activated, the weighting register G is controlled in reverse order: the first four words are assigned a weight of 4, the next four a weight of 2 and the next eight a weight of 1.

Charge collecting periods in the radiation detector determine the steepness of the signal step. To suppress the effects of variable rise times the tuning of the filter F shown in FIG. 1 is to be changed at the expense of the signal-to-noise ratio.

In the system according to the invention the influence of rise time variations can be eliminated with lower losses of the signal-to-noise ratio by leaving out of account, in the data processing, the information obtained during the time interval in which the signal step was detected, the instant $t_p$, and at least one of the succeeding adjoining intervals. This may simply be achieved by interrupting the summations, addition and subtraction, for at least two periods of $t_n$ seconds each. For this purpose, in FIG. 3 a counter having at least two positions, which is shown as a block 54, is connected between the subtraction counter 38 and the addition counter 43.

The signal recognition circuit may be provided with a supervision circuit to signal the near coincidence of two signal steps, for the radiation measuring system can only measure accurately if the rear level (2) illustrated in FIG. 4b has been measured without disturbance during a time $T$ and hence is stored in the multiple store MG. For this purpose in FIG. 5 a clock 55, for example a monostable multivibrator, has a triggering input connected to the output lead 53, permitting this clock to be started each time a signal is present on the lead 53. From each triggering instant a signal will be present at a time signal output 56 for a time $T$ prolonged by the time elapsing between addition and subtraction, which signal puts a coincidence circuit 57 into a state of readiness. If within this extended period a second signal appears on the lead 53, it will also be applied to the coincidence circuit 57 via a lead 58, causing the coincidence circuit to deliver a reset signal at its output on the line 59. By connecting this line to reset inputs of counters and registers in the data-processing device C of FIG. 2, for example the counters and registers as illustrated in FIG. 3, incorrect information is prevented from reaching a final result register ER. In addition, the number of times the reset signal is present on the line 59 may be counted.

One of the advantages of the spectrometer system according to the invention described is illustrated in the block diagram of FIG. 6. A flipflop FF is connected between the output of the signal recognition circuit SHC and counter circuits TK. At each instant $t_p$ the flipflop FF changes state, hereby switching on either counter circuit $TK_1$ or counter circuits $TK_2$ by applying a trigger signal to a line 60 or a line 61 respectively.

Although the measuring and processing time of one radiation quantum is $2T$ seconds, radiation quanta can be counted and processed every $T$ seconds, so that the accuracy of the radiation energy distribution is increased, because the loss of information due to "pile up" is reduced. If there is "pile up" within $T$ seconds, the supervision circuit in the circuit SHC responds by producing a reset signal on a line 62.

FIG. 7 is a block diagram of the measuring and data-processing part of an apparatus according to the invention in which by time-sequential storage of both the measuring data and three instants $t_p$ the integration time $T$ is optimally adjusted in accordance with the time intervals between the three instants.

The functional blocks shown in FIGS. 3 and 6 form part of the apparatus shown in FIG. 7 also.

After each time interval $t_n$ the measuring device M delivers a measuring value which is stored in the multiple store MG which has a capacity of, say, $2n_{max}$ words. The measuring values are also stores in the signal recognition circuit SHC, permitting them to be compared with one another to enable the instant $t_p$ at which a signal step occurs to be detected. At such an instant, for example the instant $t_{p1}$, there appears on the output lead 63 of SHC a pulse which is applied to an input 64 of a counting register TR, to an input 65 of a take-over register OR1, to an input 66 of a take-over register OR2 and to an input 67 of an arithmetic register RR. The counting register TR is reset to zero by the pulse and also starts counting each subsequent time interval $t_n$, for example to a connection with the internal clock pulse source by which the entire apparatus is synchronized. At the instant $t_{p2}$ a new pulse appears on the lead 63 which resets the counting register TR to zero, but via the input 65 has first permitted the take-over register OR1 to take over the contents from the counting register TR before this is reset to zero. Thus the time interval $t_{p2} - t_{p1}$ has now been stored in the take-over register OR1 in the form of $n_1 = (t_{p2} - t_{p1})/t_n$ positions. At the instant $t_{p3}$ the pulse on the lead 63 first through the input 66 causes the contents $n_1$ of the take-over register OR1 to be taken over by the take-over register $OR_2$, then through the input 65 causes the contents $n_2 = (t_{p3} - t_{p2})/t_n$ of the counting register TR to be taken over by the take-over register OR1 and subsequently TR to be reset to zero. Then the arithmetic store RR is activated via the input 67, causing it to compare the contents $n_1$ with the contents $n_2$ in order to determine from the smaller of these contents the integration time $T$ by determining $n$, where $T = nt_n$ and $n$ is smaller than $n_1$ or $n_2$. The Figure shows that parallel outputs 68 of the counting register TR are connected to the take-over register $Or_1$, that parallel outputs 69 of $OR_1$ are connected to the take-over register $Or_2$, and that $OR_1$ and $OR_2$ each have a parallel output 70 and 71 respectively connected to the counting register RR. After having determined $n$ the arithmetic register delivers a 1 signal to programming inputs 73 of a one-bit shift register SR. This shift register shifts the contents of one bit. i.e., either a 0 or a 1, one place at each clock pulse. The capacity of this shift register is, say, $2n_{max}$. At each clock pulse, and hence after each time interval $t_n$, the contents 0 or 1 of the last bit appear a an output 74 of the register SR. Because it has been found in practice that with an integrating time longer than $n_{max} t_n$ the signal-to-noise ratio does not appreciably improve, it is meaningful not to use times $T$ longer than the said time. Consequently neither the multiple store MG nor the shift register SR needs to have a capacity exceeding $2n_{max}$. Also, it is not meaningful to measure signals which succeed one another at a rate such that the noise spectrum has an excessive influence on the accuracy of the measurement. For this reason the arithmetic register RR includes a supervision circuit which ensures that the shift register SR is not programmed when $n$ is smaller than a minimum value $n_{min}$ would be.

After the instant $t_{p3}$ the arithmetic register RR applies a 1 signal to the programming inputs which correspond to the positions $n_2$ to $n_2 + n$, where $n_2$ and $n$ are to be counted from the first bit which lies opposite the output 74. In one extreme case in which $n = n_{max}$, the bits $n_{max}$ to $2n_{max}$ are provided with a 1 signal, so that a first pulse immediately appears at the output 74. In the other extreme case the bits $n_{min}$ to $2n_{min}$ are provided with a 1, so that a first pulse appears after $(2n_{max} - 2n_{min})t_n$ seconds.

It should be noted that the registers TR, $OR_1$ and $Or_2$ also have maximum storage capacities of $n_{max}$, and that in the absence of a signal step, i.e., when here is no instant $t_{p3}$, the counter TR continouous counting to $n_{max}$, after which the described process may also be effected to determine the step height at the instant $t_{p2}$.

Instead of the counting circuits $TK_1$ and $TK_2$ and the flipflop FF of FIG. 6, in FIG. 7 another possibility is shown in which a single counting circuit 75 and a flipflop gate circuit FF are used, whilst just as in FIG. 6 an arithmetic store $RG_1$ and an arithmetic store $RG_2$ have their information inputs connected in parallel via the connection 77 to the information output of the multiple store MG.

The subtraction counter 78, the buffer counter 79 and the addition counter 80 are in the zero condition when no signals are supplied from the output 74, and the registers $RG_1$ and $RG_2$ do not receive information through their connection 77. If, however, a first signal appears on the output 74 which is followed by $n$ similar signals, these signals are inserted in the subtraction counter 78. At the same time the block FF, which comprises a flipflop and gate circuits, is enabled via connections 81 and 82, so that, for example, the store $RG_1$ performs the subtraction operations for the measuring information which now is supplied to it via the connection 77. After the $n$ pulses have been inserted into the subtraction counter 78, the contents of this counter are transferred via the parallel outputs 83 to the addition counter 80, so that, after the buffer counter 79 has given the starting signal, the counter 80 can start an addition cycle of equal duration. At the same time the standardizing unit N is set through a connection 84 so as to standardize the result of the operations of $RG_1$ at the instant at which the addition counter has finished its operation and enables the final-result register via the connection 85. If, for example, $n$ is chosen in factors of 2, a time $T$ of double duration will cause the integration to be double what is required and hence the result from $RG_1$, i.e., the measure of the step height of a radiation quantum to be measured, is to be multiplied by one half, which, as has been described with reference to the weight register RG of FIG. 3, may simply be effected in the standardizing unit N by a one place shift in a binary register.

Also, after the last of the train of $n$ pulses from the output 74 the flipflop includes in the block FF is caused to change condition. As a result, the register $RG_1$ is set to the addition cycle and starts adding as soon as the addition counter 80 gives a corresponding signal through a connection 86. In the meantime, during the addition cycle for $RG_1$ the subtraction counter 78 is free and can start a new operation in that a train of $n$ pulses are inserted. For this purpose the block FF includes gate circuits which when $RG_1$ is in the addition condition cause $RG_2$ to assume the subtraction condition and permit this store to receive the measuring information present on the line 77 when there appears on the line 82 a signal which indicates that the subtraction counter 78 is counting. In the meantime the addition operation controlled by the addition counter 80 has terminated for the store $RG_1$ and after the last of the $n$ pulses the substraction counter 78 will transfer its contents to the addition counter 80 and the flipflop included in FF will change condition, so that $RG_2$ is set to the addition condition and $RG_1$ is set to the subtraction condition to be in a state of readiness to receive information as soon as pulses appear at the output 74 which indicate a third signal step to be registered.

What is claimed is:

1. A method of measuring the individual energies of radiation quanta, comprising the steps of:
   converting the radiation quanta into electrical current pulses;
   integrating the current pulses to produce a stepped waveform, the step heights of which are a measure of the energies of the radiation quanta;
   detecting the occurrences of steps in the stepped waveform;
   at each detected step occurrence, integrating the stepped waveform over a time period preceding the step occurrence to form a first integral value;
   integrating the stepped waveform over an equal time period following the step occurrence to form a second integral value; and
   subtracting the first integral value from the second integral value,
   whereby the differences between the first and second integral values are a measure of the individual energies of the radiation quanta.

2. A method as defined in claim 1 wherein the time period is the same with respect to each step occurrence.

3. A method as defined in claim 1 wherein at each detected step occurrence a time period is selected such that integrating the stepped waveform over the selected time period both preceding and following the step occurrence does not result in integrating over either a preceding or following detected step occurrence.

4. A method as defined in claim 1 wherein the step of integrating the stepped waveform over equal time periods preceding and following a detected step occurrence includes weighting the integration more heavily close to the detected step occurrence.

5. A method as defined in claim 1 wherein the step of integrating the stepped waveform over equal time periods preceding and following a detected step occurrence excludes the short time period during which the detected step is occurring.

6. A method as defined in claim 1 wherein false measurements are sensed while integrating the stepped waveform over equal time periods by sensing whether or not another step occurrence is detected while integrating.

7. Apparatus for measuring the individual energies of radiation quanta, comprising:
   a radiation detector for converting radiation quanta into electrical current pulses;
   a charge-sensitive integrating amplifier responsive to the radiation detector for converting the electrical current pulses into a stepped waveform;

timing means for establishing successive time periods $t_n$ integrating means responsive to said timing means and to the stepped waveform for generating successive integrals of the stepped waveform over said successive time periods $t_n$;

comparing means responsive to successive integrals for detecting a difference therebetween indicative of step occurrences in the stepped waveform;

a memory responsive to the successive integrals for storage thereof;

means responsive to detection of step occurrences by the comparing means for each time computing the difference between the sum of a group of successive integrals preceding the detected step occurrence and the sum of an equal sized group of successive integrals following the detected step occurrence, whereby the differences are a measure of the individual energies of the radiation quanta.

* * * * *